United States Patent [19]

Little

[11] 4,185,906
[45] Jan. 29, 1980

[54] EXPOSURE DELAY MECHANISM

[76] Inventor: Robert T. Little, 160 Columbia Heights, Brooklyn, N.Y. 11201

[21] Appl. No.: 911,376

[22] Filed: Jun. 1, 1978

Related U.S. Application Data

[63] Continuation-in-part of Ser. No. 816,362, Jul. 18, 1977, abandoned.

[51] Int. Cl.² .................... G03B 17/38; G03B 19/12
[52] U.S. Cl. .................................. 354/152; 354/266
[58] Field of Search ............... 354/152, 156, 237, 266, 354/269, 288

[56] References Cited

U.S. PATENT DOCUMENTS

| 2,210,610 | 8/1940 | White | 354/269 X |
|---|---|---|---|
| 2,952,196 | 9/1960 | Goshima | 354/156 |
| 3,062,118 | 11/1962 | Starp | 354/156 |
| 3,653,311 | 4/1972 | Sato | 354/156 |
| 3,860,941 | 1/1975 | Fukuda | 354/156 |
| 3,882,523 | 5/1975 | Uno et al. | 354/156 |
| 4,003,066 | 1/1977 | Shono | 354/156 |

Primary Examiner—Michael L. Gellner

[57] ABSTRACT

An exposure delay mechanism is initially actuatable to release the reflex mirror of a reflex camera to its film exposing position and to block movement of the shutter. The operator may wait for any desired time interval before actuating the exposure delay mechanism to release the camera operating mechanism to operate the shutter and expose the film. In this manner, the operator may wait until after shock vibrations caused by movement of the reflex mirror have subsided and for any other desired interval before exposing the film. The delay mechanism utilizes a member such as a flexible cable which is movable selectively into and out of the path of movement of a component of the camera operating mechanism which is operative to open the camera shutter after movement of the reflex mirror.

21 Claims, 8 Drawing Figures

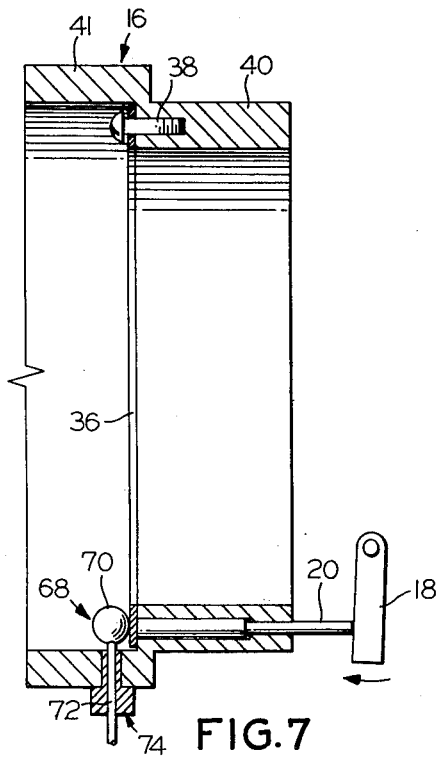
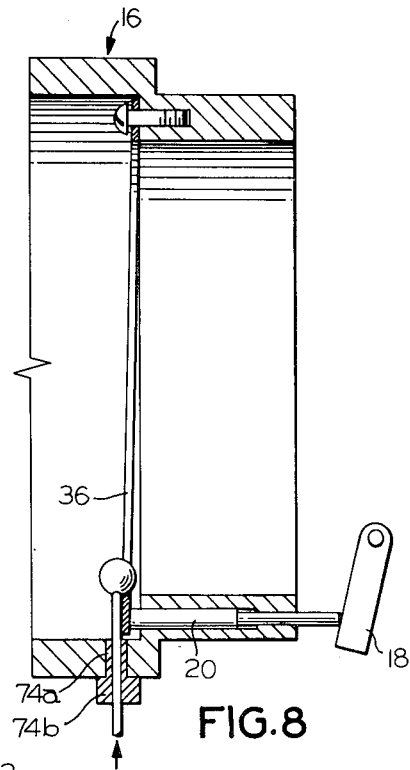
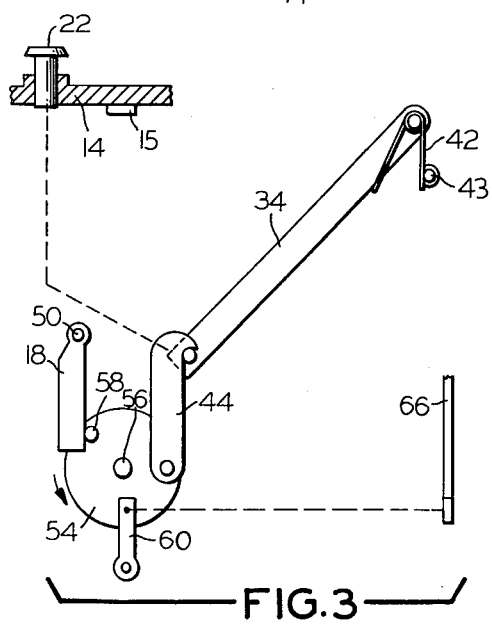
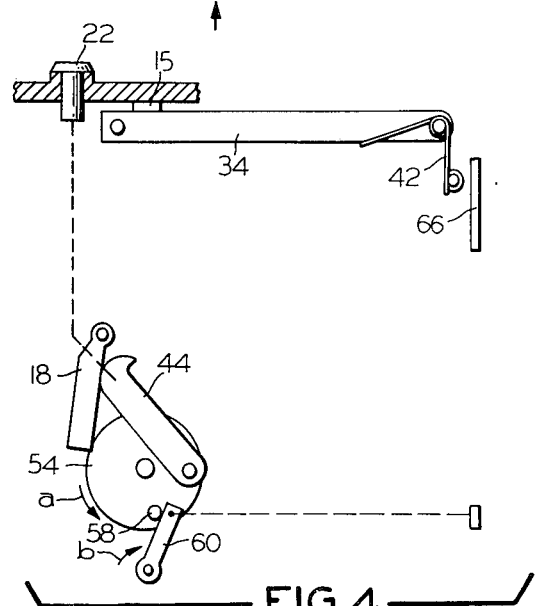
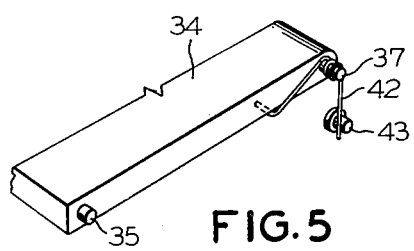
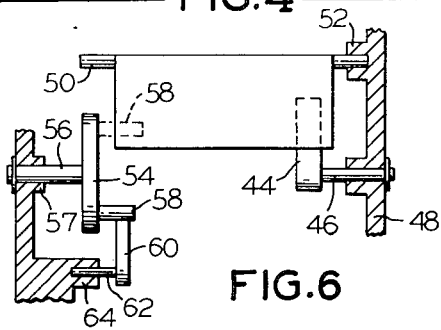

EXPOSURE DELAY MECHANISM

CROSS-REFERENCE TO RELATED APPLICATION

The present application is a continuation-in-part of my copending application, Ser. No. 816,362 filed July 18, 1977, now abandoned.

BACKGROUND OF THE INVENTION

The present invention is concerned with an exposure delay mechanism for a photographic camera, more specifically with an exposure delay mechanism for a single lens reflex camera, and with single lens reflex cameras modified by the incorporation therein of an exposure delay mechanism.

As is well known in the art, single lens reflex cameras include a reflex mirror which is mounted within the camera body and movable between two positions, usually by a spring biasing mechanism. In one position, the mirror reflects the image gathered by the lens system through a prism for viewing by the photographer. This may be referred to as the view-finding position. While in this position, the mirror is interposed between the lens system and the film to be exposed. Therefore, when it is desired to operate the camera to expose the film, the camera operating mechanism necessarily provides for moving the reflex mirror out of its view-finding position into a film exposing position in which it is removed from the light path between the lens system and the film. In most single lens reflex camera such movement of the reflex mirror is part of a continuous sequence of camera operation to expose the film. In such sequence, the mirror is rapidly moved with a snap-type action to the film exposing position, usually coming abruptly to rest against a stop and the shutter is automatically opened immediately as the mirror clears the optical path between the lens and the film. One result is that the mechanical vibration induced by the movement and abrupt stop of the mirror persists while the film is being exposed. As discussed below, the prior art has provided means to minimize such vibration. In ordinary photography such vibration does not significantly affect the quality of the photographs obtained particularly when shock absorbers or similar devices known to the art are employed. However, when employing such cameras for microscopic or astronomical photography, such vibration causes significant blurring of the photographic images obtained.

The prior art has attempted to deal with this problem. Some cameras, for example a Nikon F camera, are provided with a manual mirror release mechanism so that, after the photographer sights the image to be photographed in the view finder, he can manually move the mirror from the view finding to the film exposing position. Then, after so long an interval as desired, he operates the shutter to expose the film. Although this enables the photographer to wait any desired interval to allow the vibrations caused by the mirror movement to settle down, this system has the significant disadvantage that the manual force required to move the camera has a tendency, particularly troublesome in astronomical work, to cause slight shifting of the camera with resultant loss of the exact field of viewing sighted by the photographer while the mirror was in its view finding position. Further, this method leaves the photographer "blind" between exposures, i.e. once the mirror is moved to the film exposing position the photographer is unable to use the view finder unless the mirror is manually returned to the view finding position. Manual back and forth operation of the mirror tends to move the camera out of position. Although such cameras can be modified at considerable expense to provide for a push button type mechanism to move the mirror from, and return it to, the view finding position, the necessity for touching the camera body and imposing a sufficient force thereon to operate the pushbutton still produces undesirable shifting of the camera and vibrations.

Other cameras are known, for example, the Miranda Laborec, which have a mechanism built into the camera body which enables the photographer to raise the mirror and pause for as long as desired before tripping the shutter. This operation may be controlled by means of a remote operating cable such as an air bulb cable release. This camera, while well suited for astronomical photography is not well suited for general photography. Thus, the general photographer, if interested in astronomical or microscopic photography, much purchase a second camera specifically designed for it.

A number of prior patents deal with problems associated with vibration due to movement of the reflex mirror. For example, U.S. Pat. No. 3,860,941 discloses a shock absorbing device employed in a single lens reflex camera to attenuate vibrations caused by movement of the mirror. U.S. Pat. No. 3,003,066 discloses a mechanism providing a two-step raising of the mirror in order to reduce the shock of the movement and sudden stop of the mirror. U.S. Pat. No. 3,882,523 discloses a mirror operating mechanism in which, in order to reduce shock, the drive which operates to move the mirror to its upper position is locked against further operation when the mirror is held in its upper position. U.S. Pat. No. 3,653,311 discloses a coil type shock absorber mechanism to attenuate the shock of reflex mirror movement and sudden stopping. Other patents which illustrate other aspects of the mechanism of single lens reflex cameras are U.S. Pat. Nos. 2,952,196 and 3,062,118.

U.S. Pat. No. 2,210,610 deals with a direct viewing type of camera which utilizes a branched remote control cable means to simultaneously expose the image being photographed and identifying serial number.

It is accordingly an object of the present invention to provide a novel exposure delaying mechanism adapted to inexpensively and simply modify a single lens reflex camera to permit delay of shutter operation and thereby exposure of the film for any selected interval after the normal exposure sequence of the camera has progressed sufficiently to move the mirror into its film exposing position. This permits the operator to delay for any desired interval, including an interval long enough to permit all vibrations due to movement of the mirror to dissipate the time between mirror movement and film exposure.

It is another object of the invention to provide a novel exposure delay mechanism which may be operated remotely by means of remote operating or air bulb devices without the necessity for physically touching the camera body or an operating switch directly affixed thereto.

It is yet another object of the present invention to provide an inexpensive and simple device for modifying a single lens reflex camera by interrupting the normal camera operating sequence at a point after movement of the reflex mirror is completed and before operation of the shutter as commenced.

It is another object of the present invention to provide an improved single lens reflex camera having an exposure delay mechanism adapted particularly for telescopic and microscopic photography.

SUMMARY OF THE INVENTION

It has now been found that the foregoing and related objects can be readily attained by novel exposure delay mechanism used in combination with a photographic camera of the type having a camera body in which is mounted a shutter, a camera operating mechanism and a reflex mirror which is mounted for movement between a first view-finding position and a second film-exposing position. The camera operating mechanism has a path of travel and includes actuator means operatively connected to the mirror to move it to the film-exposing position, aperture setting means operatively connected to the mirror for movement from a first position to a second, aperture-setting position upon movement of the mirror to the film exposing position, and for restraint from such movement while the mirror is in its view-finding position, and shutter operating means operatively connected to the aperture setting means to open the shutter upon movement of the aperture setting means to its aperture-setting position.

The exposure delay mechanism comprises manually operable actuating means operatively connected to the camera actuator means to effect actuation thereof upon a first manipulative action thereon and blocking means mounted on the camera and operatively connected to the actuating means for movement between a first, blocking position in the path of travel of the camera operating mechanism, and a second, release position removed from that path by a second manipulative action upon the actuating means. The blocking means, while in its blocking position, serves to prevent movement of the aperture setting means to its aperture-setting position after movement of the mirror to its film exposing position. Therefore, operation of the shutter may be deferred for a time interval after movement of the mirror to its film exposing position by deferring operation of the actuating means for the desired interval.

The blocking means is configured and dimensioned to provide a first portion which is normally disposed in the path of travel of the operating mechanism in the blocking position thereof and a reduced width portion at that point of intersection with the release position so that the operating mechanism may pass thereby. Conveniently, the blocking means has a head portion and a body portion and the head portion is of greater width than the body portion. The body portion may be a rod or cable and the head portion a head or ball affixed to the cable and of greater width than the cable.

The camera body has a lens opening therein and conveniently a ring member is mounted in the lens opening, and the blocking means is mounted of the ring member. The combination generally utilizes a manually operable pressure means operable to move the actuator means in response to a first manually imposed pressure and to move the blocking means in response to a second manually imposed pressure. This may comprise or include a remote operating cable actuated by pressure means and having a first branch operable in response to a first imposed pressure to operate the actuator means, and a second branch, which is operable in response to a second imposed pressure greater than the first imposed pressure to operate the blocking means.

BRIEF DESCRIPTION OF THE DRAWINGS

FIG. 3 is a schematic partial side elevation view of certain components of a conventional single lens reflex camera operating mechanism, showing the reflex mirror in the view finding position;

FIG. 4 is a view corresponding to FIG. 3 showing the components with the reflex mirror in the film exposing position;

FIG. 5 is a partial schematic view of a reflex mirror showing its spring loading mechanism;

FIG. 6 is a schematic front elevation view of the components shown in FIGS. 3 and 4;

FIG. 7 is an enlarged view in cross section of a component of the embodiment illustrated in FIG. 2, showing a blocking portion of the exposure delay mechanism in its blocking position; and FIG. 8 is a view corresponding to FIG. 7 showing the blocking portion in its release position.

DESCRIPTION OF THE PREFERRED EMBODIMENT

Figure 1:
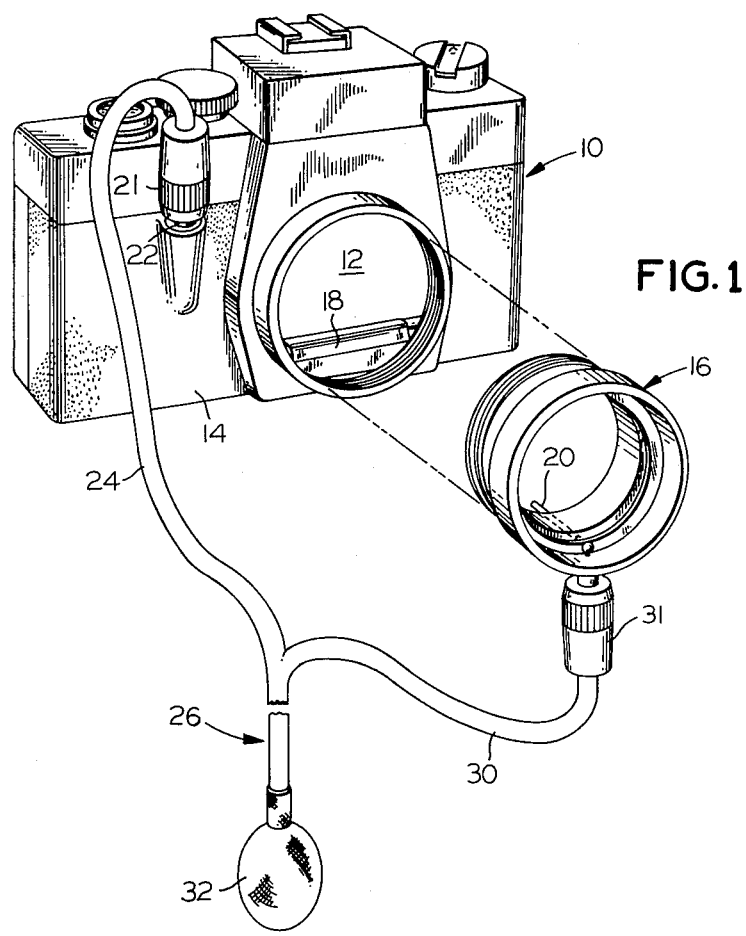
FIG. 1 is a perspective exploded view with parts omitted of a single lens reflex camera modified by one embodiment of an exposure delay mechanism of the present invention.

FIG. 1 shows a single lens reflex camera generally indicated at 10 having the usual lens opening 12 formed in camera body 14 of camera 10. Camera 10 includes the usual ring member 16 which is shown in exploded view removed from lens opening 12 in which it is normally mounted. Not shown in FIG. 1, is the camera lens system normally enclosed in the front end 36 (FIG. 2) of ring member 16, together with the camera aperture setting diaphragm. The camera lens and aperture diaphragm have been omitted from FIG. 1 for clarity of illustration and, since their structure is conventional and well-known in the art, it is not necessary to further describe it herein except to note that the diaphragm is usually an iris type system having means associated with it to adjust the size of aperture formed by it and thereby the amount of light passed through the lens and into the camera. Visible in FIG. 1 are aperture setting means 18, pivotably mounted within camera body 14 adjacent lens opening 12 thereof. As described in detail hereinafter, aperture setting means 18 is pivotably mounted to move aperture control 20 (FIG. 2) which is slidably mounted in ring member 16.

An actuator means 22, i.e., the camera operating button, is shown in FIG. 1 as having connected thereto the actuator branch 24 of a remote operating cable or hose generally indicated at 26. Cable 26 also has a second, exposure delay branch. Pressure means, comprising in the embodiment illustrated an air bulb 32, is connected to cable 26 in the conventional manner.

The embodiment illustrated represents a single lens reflex camera which has a mechanical system for setting the aperture of the lens being employed. Typical of such cameras are Praktica VLC2, Nikon F, and Voightlander VSL1 cameras. Typically, such cameras employ a mechanical aperture setting system in which a mechanical device (e.g., aperture setting means 18) is mounted for movement to operate a control pin (e.g., 20) which sets the proper size opening of the aperture diaphragm (not shown in the drawings). The aperture setting device is arranged as part of the camera operating mechanism to operate the aperture setting device as or immediately after the reflex mirror is moved to its film exposing position and to immediately thereafter operate or cause to be operated the camera shutter mechanism to expose the film. After the exposure the various parts return to their starting position in preparation for the next exposure. Since the conventional single lens reflex camera operating mechanism is well known, it will not be described in detail except insofar as necessary to illustrate the operation of the invention. Typical prior art single lens reflex camera operating mechanisms are illustrated in the above mentioned U.S. Pat. Nos. 4,003,066 and 3,882,523, the disclosures of which are incorporated by reference herein.

Figure 2:
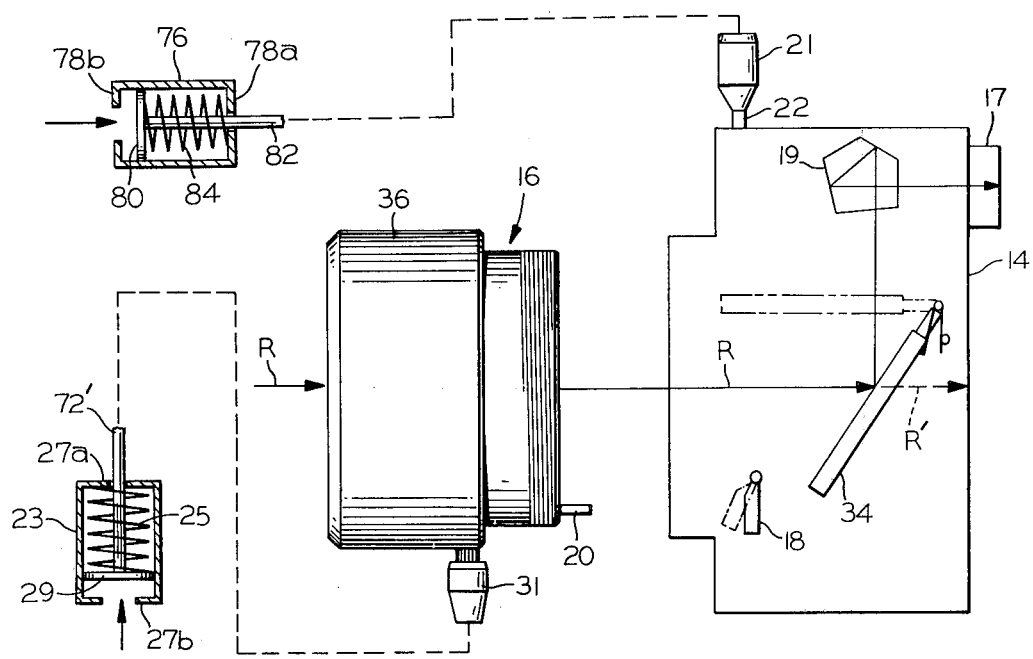
FIG. 2 is a schematic side elevation view showing the relationship of certain components of the embodiment of the invention illustrated in FIG. 1.

Referring now to FIG. 2, there is shown schematically a cross section of camera body 14 within which reflex mirror 34 is pivotably mounted for movement between its view finding position (shown in solid lines) and its film exposing position (shown in phantom outline) and of branches 24 and 30 of cable 26. Branch 30 is schematically illustrated as including a blocking means housing 31 in which is disposed an air cylinder 23 having opposite internal shoulders 27a, 27b and within which a piston or disc 29 affixed to one end of a control cable 72' is slideably retained. A coil spring 25 is seated between shoulder 27a and disc 29 to bias piston 29 and cable 72' in a direction opposite to that indicated by the arrow. Disc 29 is seated against the inside walls of cylinder 23 and acts as a piston therein. Air pressure imposed in the direction of the arrow moves disc 29 and cable 72' in the direction of the arrow. Cable 72' is connected to or is simply a continuation of cable member 72 of FIGS. 7 and 8, as described more fully hereinbelow.

Ring member 16 includes a lens housing 36 within which the camera lenses are disposed and which also contains the aperture diaphragm and means by which the diaphragm may be adjusted to provide different sized apertures for the passage of light through it and the lens system. Aperture control pin 20 is slideably mounted in ring member 16 and its movement leftward or rightward (as viewed in FIG. 2) sets the size of the aperture opening provided by the aperture diaphragm. Light rays (indicated by the arrow R) gathered by the lens are reflected by mirror 34, when in its solid line position in FIG. 2, to a prism 19 into a viewing eyepiece 17. When mirror 34 is raised, the light rays pass (as indicated by arrow R') to the rear of the camera body where, when the shutter (not shown in FIG. 2) is operated, the light impinges on the film.

Pivoting movement of aperture setting means 18 from its first position, shown in solid line in FIG. 2, to its second, aperture setting position shown in phantom outline in FIG. 2 is initiated as part of the conventional camera operation by the camera's actuator means or button. Aperture setting means 18 as schematically illustrated is seen to be of the "swing forward" type. Other types are known and conventionally used such as "side to side" or "up and down" swinging device, and obviously any other mechanical arrangement such as a sliding movement, a turning wheel or gear, etc. may be employed.

FIG. 7 is an enlarged sectional schematic view with parts broken away, of ring member 16 and shows aperture setting means 18 in its first position in contact with aperture control pin 20. In the embodiment illustrated, ring member 16 is provided with a steel O-ring 36 which is secured at the top thereof by a screw fastener 38 to a shoulder portion 40 of ring member 16. O-ring 36 is part of the conventional camera mechanism and serves to transmit movement of pin 20 to the diaphragm control (not shown). In the normal course of operating the camera, forward movement of aperture setting means 18 as indicated by the arrow in FIG. 7 moves aperture control 20 leftwardly as seen in FIG. 7, resulting in leftward movement of O-ring 36, or at least the bottom portion thereof, as seen in FIG. 8. This leftward movement of O-ring 36 sets the aperture opening in the known manner; in order to insure that the shutter is not operated until the aperture is set, the forward movement of aperture setting means 18 is also utilized to release the shutter operating mechanism. The shutter cannot be opened until aperture setting means 18 has moved to its forward position as illustrated in FIG. 8. This mode of operation and the above described portion of the structure of FIGS. 7 and 8 is conventional in the art. The present invention calls for modification of the known structure by incorporation of blocking means 68 to interrupt the operation sequence, as described more fully hereinbelow.

Referring now to FIG. 3, there is shown in schematic side elevational view reflex mirror 34 mounted within the camera body for pivoting movement between the view finding position shown in FIG. 3 and the film exposing position of FIG. 4. As shown in FIG. 5, a spring means 42 is employed to provide the motive action to mirror 34. Spring 42 is a scissors type coil spring having one leg engaged with mirror 34, a coiled intermediate portion affixed around boss 37 and a second leg engaged with a stud 43 which is mounted on camera body 14. Movement of mirror 34 to its position shown in FIG. 3 compresses spring 42 which biases mirror 34 towards its FIG. 4 position. At its opposite end, mirror 34 has a retaining lug 35 which, as shown in FIG. 3, is engaged by mirror retaining cam 44 to retain mirror 34 in position against the biasing of spring 42.

Actuator means 22 is represented as a push button mounted in camera body 14 and, as indicated by the dashed line of FIG. 3, operatively connected to mirror retaining cam 44, which is pivotably mounted about its cam shaft 46. As seen in FIG. 1, the actuator branch 24 of the cable 26 includes an actuator housing continued as 21 in which is disposed a piston/cylinder configured and constructed similar to that of the blocking means housing 31. Included is an air cylinder 76 having internal shoulders 78a, 78b and within which is retained a piston or disc 80 having one end of a cable or rod 82 affixed thereto. The coil spring 84 is seated between shoulder 78a and piston 80 to bias piston 80 and cable 82 in a direction opposite to that indicated by the arrow. The opposite end of the rod or cable 82 threads into the actuator button 22 (or its housing depending upon the style or remote cable actuator adapter provided on the camera). Air pressure imposed on the bulb 32 will move the piston 80 and the cable or rod 82 in the direction of the arrow against the spring pressure of spring 84 to operate the actuator button 22 and thereby trip the mirror mechanism as hereafter described.

Referring to FIGS. 3 and 6, cam shaft 46 is suitably mounted within a support 48 which may be a portion of camera body 14 or a web support formed therein. Aperture setting means 18 is pivotabably mounted about a shaft 50 carried in a shaft support 52. A shutter operating wheel 54 is mounted for rotation about a wheel shaft 56 carried for rotation in a wheel shaft support 57 which may also be formed into or as part of camera body 14. Shutter operating wheel 54 has a tripping stud 58 formed adjacent its periphery and projecting outwardly from the face of wheel 54. In the position of the components shown in FIG. 3, tripping stud 58 is retained by aperture setting means 18 so as to prevent rotation of shutter operating wheel 54 in the direction indicated by the arrow in FIG. 3. A shutter operating lever 60 is mounted for pivoting movement about its lever shaft 62, which is supported in lever shaft support 64. A portion of the camera shutter 66 is shown in FIG. 3 and the dot dash line connecting shutter operating lever 60 and shutter 66 indicates suitable means to open shutter 66 in response to movement of shutter operating lever 60 in the direction shown by the arrow b in FIG. 4. With the camera components in the position shown in FIG. 3, the camera operator may observe the image through the view finder as schematically illustrated in FIG. 2. When the operator is ready, actuator means 22 is depressed and, in the known manner, this causes mirror retaining cam 44 to be moved to the position shown in FIG. 4 in which it moves aperture setting means 18 leftwardly. This release tripping stud 58 which permits shutter operating wheel 54 to rotate in the direction indicated by arrow a in FIG. 4 so that tripping stud 58 engages shutter operating lever 60 and moves it in the direction of arrow b. Shutter 66 is thus raised to expose the film (not shown, but which is positioned rightwardly of shutter 66 in FIGS. 3 and 4) to light passing through the lens system. The leftward movement of mirror retaining cam 44 frees reflex mirror 34 so that spring means 42 flips mirror 34 to the position shown in FIG. 4, causing to rest against a stop 15.

The schematic representation of components shown in FIGS. 3 and 4 is conventional and known in the art and schematically illustrates but one of the numerous operating mechanisms employed to attain the same result.

The camera operating mechanism includes both mirror and shutter operating mechanisms, which in this case include the members illustrated in FIGS. 3, 4, and 6 for releasing the mirror and operating the shutter as well as members 18 and 20 of FIGS. 7 and 8 for setting the aperture. Camera operating mechanisms vary from camera to camera, but in order to achieve sequential movements of their members, most camera operating mechanisms are arranged so that the movements of many of the members of the operating mechanism depend on the occurrence of previous movements of other members. For instance, movement of aperture setting means 18 takes place due to the motion of cam 44, while tripping stud 58 does not move until aperture setting means 18 has moved far enough to permit it. These movements that are necessary for completion of the sequence define a path of travel that includes the path taken by the mirror operating mechanism, namely, the path of the push button 22 as far as is required to release mirror 34. The path of travel also includes the path taken by the shutter operating mechanism, namely, the path taken by cam 44 as far as is required to move aperture setting means 18 enough to release tripping stud 58, by tripping stud 58 as far as is required to move shutter operating lever 60 enough to trip the shutter, and by lever 60 itself to the same extent. The path of travel further includes the paths of any other motions of the operating mechanism necessary to permit the shutter to operate. As so defined, the path of travel of the shutter operating mechanism in this case also includes, for example, the motion of aperture control pin 20 to the extent required to permit aperture setting means 18 to allow shutter operating wheel 54 to rotate because interruption of this motion of pin 20 interrupts succeeding motions of the mechanism. Interruption of movement through any part of this part interrupts succeeding actions in the sequence. Those skilled in the art will recognize that other reflex-camera shutter operating mechanisms will also have paths of travel whose blockage prevents operation of the shutter after the mirror has moved.

Remote cable actuators using air pressure and reflex cameras are of course old in the art and the present invention resides in the adaptation of the exposure delay mechanism in such structures. Essential to the delay mechanism is the blocking means to be mounted on the camera and the means for effecting sequential operation of mirror and shutter.

The blocking means is illustrated in FIGS. 7 and 8 wherein blocking means 68 is seen to comprise a head portion 70 mounted upon a body portion 72. Head portion 70 is seen to be of greater width than body portion 72 and, in the embodiment illustrated, head portion 70 comprises a bead or ball affixed to a segment of flexible cable which comprises body portion 72. Blocking means 68 has been mounted on camera 10, more specifically on ring member 16 of camera 10, by drilling a radially extending passage through a cylindrical body portion 41 of ring member 16 (the passage being unnumbered in FIGS. 7 and 8) and inserting therein a fitting 74 (FIG. 7) having a neck portion 74a (FIG. 8) which fits within the radial passage and a wider collar portion 74b which seats against the exterior surface of body portion 41. Fitting 74 has a passage formed therein (unnumbered) in which body portion 72 of blocking means is slideably received. As shown in FIG. 2, with spring 25 biasing cable 72' against shoulder 27b, blocking means 68 is in the position shown in FIG. 7 of the drawing. In the position shown in FIG. 7, head portion 70 of blocking portion 68 is seated against the bottom portion of steel O-ring 36 and retains it against leftward movement it would otherwise undergo in response to the force applied by aperture setting means 18. However, blocking means 68 retains O-ring 36, and therefore aperture control in 20 and aperture setting means 18 in position. Operation of actuator means 22 thus serves only to release mirror 34, which immediately moves to the position shown in FIG. 4. Aperture setting means 18 is held in the position shown in FIG. 3 and holds mirror retaining cam 44 against completing its leftward movement to its position shown in FIG. 4.

It is not until the operator actuates exposure delay branch 30 to move cable 72', which is connected to or is contiguous with body portion 72, to move blocking means 68 upwardly to its FIG. 8 position that O-ring 36 clears head portion 70 and is free to move leftwardly. When it is desired to move cable 72' (FIG. 2) against the biasing force of spring 25, this is done by mechanically or pneumatically pushing against disc 29 as indicated by the arrow. In a preferred embodiment, this is accomplished by imposing air pressure by means of an air bulb 32 against disc 29 to advance cable 72' against spring 25. Since the operator may delay operation of control branch 30 for any desired time interval after operation of actuator 22 to move mirror 34, he may wait until all vibrations caused by the movement and sudden stop of reflex mirror 34 have subsided before exposing the film.

As illustrated in FIG. 1, remote means to operate actuator means 22 and the blocking means 68 may be serviced by a single pressure generating means such as air bulb 32. Delay branch 30 may be made responsive to a higher pressure than that which will operate actuating means 22. In the illustrated embodiment, the spring 25 of the blocking means piston/cylinder is stiffer than the spring 84 of the actuator piston/cylinder. Generally, the biasing force of the spring 25 should be at least 33 ⅓%, and preferably at least 50%, greater than the biasing force of the spring 84. In practice, a differential of 100% has proven effective to insure that a clear differential in the manual pressure required to operate the two piston/cylinders exists.

In use of the illustrated embodiment, the operator squeezes the bulb 32 gently the first time to operator actuator means 22, waits any desired interval and then squeezes the bulb 32 more vigorously a second time to operate blocking means 68. Because the actuator means 22 has already tripped the mirror, its concurrent operation with the blocking means 68 is of no moment.

In another embodiment, a remote cable may include a valve with two exit ports which are differentially spring loaded and which direct pressure to the blocking and actuator means. Any other type of mechanical or pneumatic device of sequential nature may be used in which a plunger or air bulb or button is pushed a first time to operate actuator means 22 and a second time to operate blocking means 68. Such air bulbs and mechanical remote control devices include two-way valves and other devices to provide for sequential operation. Obviously, two separate controls may be employed as the actuating means, one for actuator 22 and one for blocking means 68. Equally obviously any other suitabe control means, electrical or radio operated for example, may be employed.

When camera 10 is employed for photography so sensitive that shock vibration of the mirror is a factor, it will normally, of course, be mounted on a suitable support such as a camera tripod. For astronomical or microscopic photography the camera is normally mounted directly to the telescope or other optical instrument. For example, the camera lens is removed and ring member 16 may comprise a suitable extension or adapter ring without a lens system of its own which is attached directly to a telescope or other optical instrument so the camera employs the lens system of the optical instrument. Although a telescope has no aperture diaphragm on it, this does not preclude the use of the exposure delay means of the invention. For example, with reference to FIGS. 7 and 8, using the blocking means 68 to delay leftward movement (as used in those figures) of aperture setting means 18 prevents, for the desired interval, operation of shutter operating wheel 54; this provides the desired delay for operation of the shutter even though the movement of aperture setting means 18 does not perform an aperture setting function.

It will be appreciated that no modification whatsoever is required to a standard single lens reflex camera having a mechanical aperture setting means to provide the camera with the exposure delay mechanism of the present invention.

While the invention has been described in detail with reference to a specific embodiment thereof, it will be appreciated that upon a reading and understanding of the foregoing numerous modifications may be made thereto without departing from the spirit of the invention. It is intended to include all such modifications within the scope of the appended claims.

Having thus described the invention, what is claimed is:

1. In a photographic camera of the type having a camera body in which is mounted a shutter, a camera operating mechanism and a reflex mirror mounted for movement between a first, view-finding position and a second, film-exposing position, said camera operating mechanism having a path of travel and including a mirror operating mechanism operatively connected to said mirror to move said mirror to said film exposing position and a shutter operating mechanism operatively connected to said mirror for movement along a path of travel from a first position to a second, shutter-opening position upon movement of said mirror to said film-exposing position and to be restrained from such movement while said mirror is in said view-finding position,
    the combination therewith of an exposure delay mechanism comprising:
    (a) manually operable actuating means operatively connected to said mirror operating mechanism to effect actuating thereof upon a first manipulative action thereon; and
    (b) blocking means mounted on said camera and operatively connected to said actuating means for movement between a blocking position in said path of travel of said shutter operating mechanism and a release position removed from said path by a second manipulative action upon said actuating means, whereby operation of said shutter may be deferred for a time interval after movement of said mirror to said film exposing position by deferring action of said actuating means upon said blocking means for the desired interval.

2. The combination of claim 1 wherein said blocking means is configured and dimensioned to provide a first portion normally disposed at a point in the path of travel of said shutter operating mechanism in said blocking position thereof and a reduced portion at said point of intersection with said path of travel of said shutter operating mechanism in said release position thereof to permit said operating mechanism to pass thereby.

3. The combination of claim 2 wherein said blocking means has a head portion and a body portion providing said first and reduced portions respectively, said head portion being of greater width than said body portion and said blocking means being mounted on said camera for slideable movement between said release and blocking positions in a path intersecting the path of travel of said shutter operating mechanism.

4. The combination of claim 3 wherein said body portion of said blocking means comprises a cable member and said head portion comprises a bead of greater width than said cable member and affixed thereto.

5. The combination of claim 4 wherein said bead portion is a ball affixed to said cable at one end thereof.

6. The combination of claim 1 wherein said manually operable actuating means comprises manually operated pressure means operable to move said mirror operating mechanism in response to a first manually imposed pressure and to move said blocking means in response to a second manually imposed pressure.

7. The combination of claim 1 wherein said manually operable actuating means includes a remote operating member actuated by manually operated pressure means and having a first branch operable in response to a first imposed pressure to operate said mirror operating mechanism and a second branch which is operable in response to a second imposed pressure greater than said first imposed pressure to operate said blocking means.

8. The combination of claim 7 wherein said pressure means is a squeeze bulb which generates air pressure when squeezed and said first branch is responsive to a first air pressure so generated to operate said mirrors operating mechanism, and said second branch is responsive to a second air pressure so generated which is greater than said first air pressure to move said blocking means to its release position.

9. The combination of claim 7, wherein each of said branches of said operating member includes a pressure responsive member normally biased into a first position and respectively responsive to operation of said pressure means to move to a second position for actuating of said mirror operating mechanism and movement of said blocking means.

10. The combination of claim 9 wherein said pressure responsive members include pistons slidable in a cylinder and acted upon by air pressure generated by said squeeze bulb, spring means biasing said pistons into the said first positions of the pressure responsive members and cable means attached to said pistons and operatively engaged with said mirror operating mechanism and said blocking means to effect the movement thereof upon movement of said pistons.

11. The combination of claim 1 wherein said shutter operating mechanism includes aperture setting means operatively connected to said mirror for movement along the path of travel from a first position thereof to a second, aperture setting position upon movement of said mirror to said film-exposing position and to be restrained from such movement while said mirror is in said view-finding position, and shutter operating means operatively connected to said aperture-setting means to open said shutter upon movement of said aperture setting means to said aperture setting position, and wherein said blocking position of said blocking means is located in said path of travel of said aperture setting means for prevention by said blocking means of movement of said aperture setting means to said aperture setting position.

12. The combination of claim 11 wherein said camera body has a lens opening therein and includes a ring member mounted in said lens opening and wherein said blocking means is mounted on said ring member.

13. The combination of claim 12 wherein said body portion of said blocking means is slidably received within said ring member.

14. The combination of claim 13 wherein an aperture control member is mounted in said ring member and is operative to set the aperture of said camera, and said aperture setting means, when in its aperture setting position, operates said aperture control member.

15. The combination of claim 1 wherein said camera body has a lens opening therein and a ring member mounted in said lens opening and wherein said exposure delay mechanism is attached to said ring member, and said actuating means includes pressure responsive means operatively connected to said blocking means to move said blocking means between said release position and said blocking position.

16. An exposure delay mechanism for use with a camera of the type having a camera body with a lens opening therein, a ring member mounted in said lens opening, a shutter, a camera operating mechanism and a reflex mirror mounted for movement between a first, view-finding position and a second, film-exposing position, the camera operating mechanism having a path of travel and including a mirror operating mechanism operatively connected to the mirror to move said mirror to said film exposing position and a shutter operating mechanism operatively connected to the mirror for movement along a path of travel from a first position to a second, shutter-opening position upon movement of the mirror to the film-exposing position and to be restrained from such movement while the mirror is in said viewing position, said exposure delay mechanism comprising:

(a) manually operable actuating means for operative connection to the mirror actuating mechanism to effect actuation thereof upon a first manipulative action thereon; and (b) blocking means mountable on the camera and operatively connected to said actuating means for movement between a blocking position in said path of travel of the shutter operating mechanism and a release position removed from the path by a second manipulative action upon said actuating means, whereby operation of the shutter may be deferred for a time interval after movement of the mirror to the film exposing position by deferring action of said actuating means upon said blocking means for the desired interval.

17. The combination of claim 16 wherein said blocking means is configured and dimensioned to provide a first portion normally disposed in the path of travel of the shutter mechanism in the blocking position thereof and a reduced portion at the point of intersection with the path of travel of the shutter operating mechanism in the release position thereof to permit the operating mechanism to pass thereby.

18. The combination of claim 16 wherein said manually operable actuating means includes a remote operating member actuated by manually operated pressure means and having a first branch operable in response to a first imposed pressure to operate the mirror operating mechanism and a second branch which is operable in response to a second imposed pressure greater than said first imposed pressure to operate said blocking means.

19. The combination of claim 18 wherein said pressure means is a squeeze bulb which generates air pressure when squeezed and said first branch is responsive to a first air pressure so generated to operate the actuator means, and said second branch is responsive to a second air pressure so generated which is greater than said first air pressure to move said blocking means to its release position.

20. The combination of claim 16 wherein each of said branches of said operating member includes a pressure responsive member normally biased into a first position and respectively responsive to operation of said pressure means to move to a second position for actuation of the mirror operator mechanism and movement of said blocking means.

21. The combination of claim 20 wherein said pressure responsive members include pistons slidable in a cylinder and acted upon by air pressure generated by said squeeze bulb, spring means biasing said pistons into the said first positions of the pressure responsive members and cable means attached to said pistons and respectively operatively engageable and engaged with the mirror operating mechanism and said blocking means to effect the movement thereof upon movement of said pistons.

* * * * *

UNITED STATES PATENT AND TRADEMARK OFFICE
CERTIFICATE OF CORRECTION

PATENT NO. : 4,185,906
DATED : January 29, 1980
INVENTOR(S) : Robert T. Little

It is certified that error appears in the above-identified patent and that said Letters Patent are hereby corrected as shown below:

Column 10, line 23; Column 11, line 17, in each instance, "actuating" should be -- actuation --;

Column 11, line 8, "mirrors" should be -- mirror --;

Column 12, line 30, after "shutter" insert -- operating --;

Column 12, line 56, "operator" should be -- operating --.

Signed and Sealed this

Twenty-fourth Day of June 1980

[SEAL]

Attest:

SIDNEY A. DIAMOND

Attesting Officer

Commissioner of Patents and Trademarks